United States Patent Office 3,216,784
Patented Nov. 9, 1965

3,216,784
PURIFICATION OF HALOGENATED DERIVATIVES OF SILICON AND GERMANIUM
Roland Gauguin, Neuilly-sur-Seine, and Georges Nury, Montmorency, Seine-et-Oise, France, assignors to Pechiney, Compagnie de Produits Chimiques et Electrometallurgiques, Paris, France, a corporation of France
No Drawing. Filed Mar. 6, 1961, Ser. No. 93,336
Claims priority, application France, Mar. 16, 1960, 821,492, Patent 1,259,489
9 Claims. (Cl. 23—14)

The present invention, which has resulted from applicants' investigations, relates to a process for purifying liquid halogenated derivatives of silicon and germanium and, in particular, chlorides and hydrochlorides such as $SiCl_4$, $GeCl_4$, $SiHCl_3$, $GeHCl_3$, $SiH_2Cl_2$, $GeH_2Cl_2$, the said process consisting in separating the impurities in the form of stable, non-volatile, solid precipitates by combining them with a compound of the type of triphenylcarbinol. The process makes it possible, by the use of simple rectification, to obtain very pure starting materials which can be employed without any further treatment in the manufacture of semi-conductors.

It has been proposed to eliminate boron by forming a solid addition compound with triphenylmethyl chloride. Indeed, it is known that boron trichloride forms an equimolecular solid addition compound when it is subjected to the action of triphenylmethyl chloride. However, triphenylmethyl chloride presents the disadvantage of low stability in the presence of moisture. As a result of this fact, and in order to enhance storage ability and easier use, there is added thereto a stabilizer which, in general, is acetyl chloride (10% by weight) a substance which possesses the double drawback of being volatile (having a boiling point of 51° C.) and, therefore, of introducing into the final silicon traces of carbon, and of nearly always comprising, as a result of its manufacture, traces of phosphorous-containing impurities which are extremely undesirable in the manufacture of semi-conductors. Moreover, triphenylmethyl chloride melts at 110° C. but cannot be distilled at atmospheric pressure without decomposing (it boils at about 280° C. at a pressure of 20 mm.).

The process which constitutes the object of the present invention avoids all the disadvantages of triphenylmethyl chloride. The process uses as precipitating agent triphenylcarbinol, a substance which is stable in air and water without a stabilizer, melts at 180° C. and boils at 380° C. at atmospheric pressure without decomposing. It can readily be purified either by distillation, or by washing and drying. In addition, it possesses the advantage of eliminating simultaneously with the boron, aluminum gallium, indium, thallium, titanium, vanadium, antimony and tin present in the form of hydrides or chlorides in the halogenated or hydrohalogenated liquid compounds of silicon and germanium.

The present invention consists, therefore, in bringing about the formation of equimolecular addition complexes with triphenylcarbinol at the expense of the metallic compounds present in the liquid halogenated compounds of silicon and germanium. These halogenated compounds function themselves as solvents of the triphenylcarbinol. The reaction is produced rapidly and, in the presence of even a small excess of triphenylcarbinol, takes place quantitatively in a few hours. The stability to heat of the formed addition compounds is great and the volatility is practically zero, which makes it possible to obtain directly, in a pure state, halides or hydrohalides of silicon or of germanium by rectification without the necessity of decanting or filtering the liquids. This is of great practical importance because the manipulation of these compounds, which are very sensitive to the action of moisture, is always a delicate operation.

The addition reaction of triphenylcarbinol with the chlorides of the elements to be eliminated takes place at ordinary temperatures. The medium being homogeneous upon starting, it is not indispensable to agitate during the precipitation. In order to insure that the last traces of the impurities have reacted, it is desirable to maintain contact for several hours before rectifying the mixture. A proportion of triphenylcarbinol comprised between 2 and 5 times the theoretical quantities necessary for the formation of the precipitate is quite sufficient to insure complete elimination of the impurities. In practice, the quantity of the impurities is small and, generally, not known with certainty, so that the excess of precipitating reagent can be extremely large. This does not present any inconvenience. Quantities of the order of 10,000 times the theoretical quantity have been employed without difficulty: the excess reagent is completely eliminated during the final rectification of the treated product.

Moreover, the purification process which is the object of the invention presents the great advantage of not necessitating any additional manipulation and of being applicable to crude halogenated derivatives obtained by reacting hydrochloric acid with the metalloid, in the presence of powdered copper, following simple condensation and without preliminary rectification. This crude product contains as principal impurities: aluminum, titanium and traces of boron, vanadium, antimony, tin, etc. It is treated in that condition, in the cold state, with a large quantity of triphenylcarbinol which dissolves readily, contact being maintained for several hours. Thereafter, the pure product is obtained by simple rectification. In this way, the excess of triphenylcarbinol is completely eliminated simultaneously with the impurities which have been precipitated. The excess triphenylcarbinol can be recovered in the residue of the distillation and can be recycled, if necessary, following purification by crystallization in a suitable solvent.

The following examples are given to illustrate the invention which, however, is not limited to the particular cases given.

The first examples are directed to the elimination of certain impurities which have been intentionally added in quantities much larger than those encountered in practice, and are intended to show the effectiveness of the purification process.

The treated liquid does not have any function in the reaction unless it be that of a solvent; further, the examples given in the case of trichlorosilane are applicable without any modification to silicon tetrachloride, to dichlorosilane and to corresponding derivatives of germanium.

Example 1

Boron trichloride is dissolved in pure trichlorosilane in the proportion of 1.2 molecules of $BCl_3$ for each 100 molecules of trichlorosilane. This quantity of impurities is much larger than that encountered in practice. Triphenylcarbinol is then added in the proportion of 2.4 molecules per each 100 molecules of trichlorosilane, that is, twice the theoretical quantity necessary for the precipitation of boron chloride. There is rapidly produced an abundant yellow precipitate which is permitted to decant (settle). After resting for 5 hours at ordinary temperature, the solution is decanted and, during an interval of 2 more hours, there is hardly observed any additional formation of precipitate. The trichlorosilane is then distilled taking every precaution to avoid contact with moisture. The distillate does not contain any boron, nor triphenylcarbinol. The excess of triphenylcarbinol is recovered in the residue of the distillation.

Example 2

There is introduced into trichlorosilane a quantity amounting to 0.02% molecule of aluminum trichloride, and there is then added a quantity of triphenylcarbinol 10 times larger than the theoretical quantity required for the formation of the compound $AlCl_3(C_6H_5)_3COH$.

Agitation is carried out for 1 hour. There is formed a dark yellow precipitate which is separated by settling (decantation). The solution is permitted to rest for 5 hours and no additional formation of precipitate is observed. The solution is then distilled. The pure trichlorosilane is collected and the excess triphenylcarbinol is recovered in the residue. The distilled trichlorosilane no longer contains any aluminum which can be determined either chemically or spectrographically.

Example 3

To a mixture containing trichlorosilane and silicon tetrachloride, there is added 100 parts per million boron trichloride and 50 parts per million aluminum trichloride, followed by the addition of triphenylcarbinol in a quantity 10 times larger than that required for the formation of addition compounds with $BCl_3$ and $AlCl_3$. The solution is agitated to render it homogeneous and is permitted to rest for 24 hours. There is then observed the presence of a small quantity of yellow precipitate. Without separating the precipitate, distillation is carried out. It is not possible to detect either boron or aluminum when the distillate is subjected to spectrographic analysis.

Example 4

The process is started with the crude trichlorosilane formed by reacting, in a fluid bed, powdered silicon alloyed with 3% copper with hydrochloric acid, and, thereafter, condensing the reaction gas at —30° C. The resultant liquid contains 94% trichlorosilane, 1% dichlorosilane, and 5% silicon tetrachloride. There are present, as harmful contaminants, 120 parts per million titanium, the major part of which exists in the form of $TiCl_3$, 5 parts per million aluminum in the form of $AlCl_3$, and traces of boron and of other metals which are detected by emission spectra, following hydrolysis of a crude sample. A ton of this crude product is treated at ordinary temperature with 500 grams of triphenylcarbinol which is rapidly dissolved upon moderate agitation.

The mass is permitted to rest for 24 hours and there is observed the formation of a small quantity of a solid brown precipitate. A sample is removed and filtered in the absence of moisture, and the impurities are determined and it is found that the quantities which remain are at the limit of spectographic determination (analysis).

Spectographic analysis carried out on a sample treated as stated above gave the following results:

Aluminum _____ Less than 0.1 part per million.
Titanium _____ About 9 parts per million.
Other metals _____ Interdeterminable ("indosables").

The treated product is then continuously rectified at ordinary pressure in a packed column provided with a device which protects against the action of moisture. The recovered trichlorosilane is substantially pure. Hardly any trace of triphenylcarbinol can be detected therein. Spectographic examination merely shows the presence of traces of iron.

While the specification and the examples emphasize the use of triphenylcarbinol for precipitating the contaminants from the liquid halogenated compounds of the semi-conductor elements belonging to the Fourth Group of the Periodic System, it is to be understood that other members belonging to the class of compounds having the general formula $Ar_3COH$ can be used in lieu of triphenylcarbinol without departing from the inventive scope of the invention claimed herein. Triphenylcarbinol merely constitutes the simplest representative of the class of compounds $Ar_3COH$.

As solvents for removing and purifying the excess triphenylcarbinol from the residue of the distillation, there can be used: benzene, carbon tetrachloride, carbon sulfide.

The term "halogenated" derivatives or compounds, as used in the instant specification and in the appended claims, comprises both halides and hydrohalides of the elements under consideration.

The term "ordinary temperature" employed in the specification is used to designate room temperature.

We claim:

1. Process for removing substantially completely impurities comprising metallic compounds contained in liquid halogenated compounds of semi-conductor elements belonging to the group consisting of silicon and germanium, comprising the following steps: contacting the halogenated compound to be purified with an excess of triphenylcarbinol, $(C_6H_5)_3COH$, to thereby precipitate a solid, stable, substantially non-volatile addition complex of said carbinol and the impurities to be removed; distilling the reaction mixture to thereby separate the purified halogenated compound from the precipitated complex and excess triphenylcarbinol, and recovering the halogenated compound substantially free of said impurities.

2. Process according to claim 1, wherein the halogenated compound is a chloride.

3. Process according to claim 1, wherein the halogenated compound is a hydrochloride.

4. Process according to claim 1, wherein the impurities to be removed contain at least one of the elements selected from the group consisting of boron, aluminum, gallium, indium, thallium, titanium, antimony and tin.

5. Process according to claim 1, wherein there is added 2 to 10,000 times the theoretical quantity of triphenylcarbinol necessary for the formation of the precipitate.

6. Process according to claim 1, wherein there is added 2 to 5 times the theoretical quantity of triphenylcarbinol necessary for the formation of the precipitate.

7. Process according to claim 1 wherein the reaction mixture is agitated at room temperature, and thereafter permitted to rest for 5 to 24 hours at room temperature before distilling off the purified halogenated compound.

8. Process according to claim 7, wherein the excess triphenylcarbinol is recovered from the residue of the distillation by treatment with a solvent and crystallization of the triphenylcarbinol from the resultant solution, and the purified, excess triphenylcarbinol thus recovered is used in the treatment of additional quantities of halogenated compounds contaminated by said impurities.

9. Process for removing substantially completely minor amounts of impurities comprising metallic compounds contained in liquid halogenated compounds of semi-conductor elements belonging to Group IV of the Periodic System, comprising the steps of: contacting the halogenated compound to be purified with an excess of a reagent selected from the class of compounds having the general formula $Ar_3COH$, where Ar designates an aryl group, to thereby precipitate a solid addition complex of said reagent with the impurities to be removed, and thereafter separating the substantially purified halogenated compound from the precipitated complex and excess reagent.

References Cited by the Examiner
FOREIGN PATENTS
834,380    5/60    Great Britain.

MAURICE A. BRINDISI, *Primary Examiner.*